Feb. 20, 1968   E. D. SCHLOEMER   3,369,786
CLAMPS FOR AUTOMOBILE SEAT HEADREST
Filed Oct. 22, 1965
*Fig. 1*
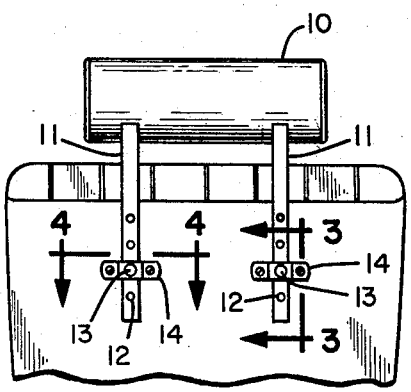
*Fig. 2*
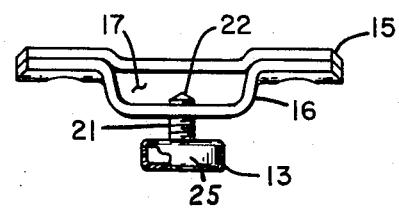
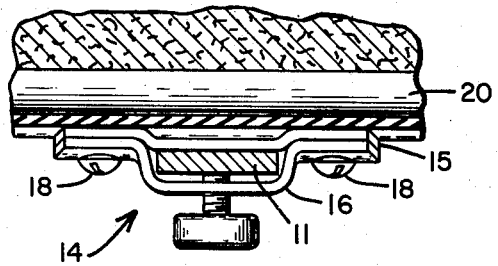
*Fig. 4*
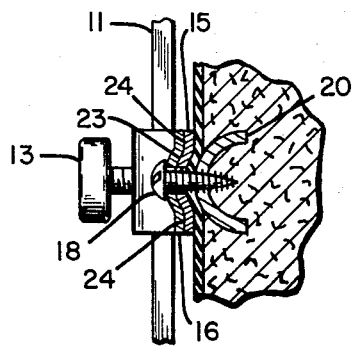
*Fig. 3*
INVENTOR
EARL D. SCHLOEMER
BY *Stryker & Jacobson*
ATTORNEYS United States Patent Office 3,369,786
Patented Feb. 20, 1968

3,369,786
CLAMPS FOR AUTOMOBILE SEAT HEADREST
Earl D. Schloemer, Hudson, Wis., assignor to Sterling Products Co., Inc., St. Paul, Minn., a corporation of Minnesota
Filed Oct. 22, 1965, Ser. No. 502,230
5 Claims. (Cl. 248—118)

ABSTRACT OF THE DISCLOSURE

A pair of plate clamp members for each supporting strap of an automobile headrest are constructed in a manner to be bolted securely to the back support of an automobile seat and to provide a slot through which the supporting strap may be adjustably moved and releasably secured by a clamping screw.

This invention relates generally to the field of headrests for automobile seats and more particularly is directed toward improved means for attaching the headrests to the seats.

The headrest is acknowledged in many quarters today as an important safety device for automobiles. Experiments and experience have shown that painful and oftentimes serious injury, in the event of an accident, can be prevented or at least minimized by headrests attached to the front seats of an automobile. The support provided by the headrest to the head of the occupant of the seat goes a long way to prevent or at least minimize the danger of whiplash in the event of a rear-end collision or similar type of accident. In order to do an adequate job the construction of the headrest must meet certain minimum requirements. For one, the headrest must be suitably secured to the seat so that it can provide the necessary support when the occasion demands and not be torn away or otherwise loosened at the time of impact. A feature of the present invention is that it provides secure attachment of the headrest to any type of the most common variety of automobile seats such as the rounded-back bucket seat variety or those constructed with a relatively flat back.

Another requirement is that the headrest be adjustable up and down to suit the individual occupant of the seat. This is not only to provide for support at the proper location but also for comfort.

It is an object of this invention to provide means for attaching the headrest to the seat in an adjustable manner but yet with sufficient security so that it will not become loose in the event of impact.

Another feature of the present invention is that it presents a minimum of danger to the occupant of the backseat in the event of a collision or sudden stop which might throw the backseat occupant forward into the back of the front seat.

Still a further feature of this invention is that the upholstery on the back of the seat to which the headrest is attached is protected against damage due to adjustment.

In a preferred embodiment of this invention, the plate members which support the vertical support straps for the headrest contain shallow grooves or channels which conform to the shape of supporting bars contained in the back of an automobile seat so that the clamp will rest firmly and securely against the bar. The plate members are also provided with flanges for resting firmly against the flat surfaces of other types of supporting bars.

These and other objects and features of the invention will become apparent during the course of the following detailed description with reference to the accompanying drawings in which:

FIG. 1 is a view of the upper portion of the back of a front seat of an automobile showing a headrest attached to the seat by a preferred embodiment of this invention;

FIG. 2 is a more detailed view of the assembly of a preferred embodiment of the invention;

FIG. 3 is a side sectional view as taken along viewing line 3—3 of FIG. 1; and

FIG. 4 is a top sectional view as taken along viewing line 4—4 of FIG. 1.

Throughout the various figures similar parts are identified by the same reference numeral. A suitable headrest 10 is made in a form and of a material to provide comfortable support for the head of the occupant of the seat. The headrest 10 is supported by a pair of support rods or straps 11 which extend down the back of the seat and are sufficiently rigid to provide adequate support for the head in the event of an impact which would otherwise cause the head to snap backward. Each of the headrest support rods 11 contains a group of adjustment holes 12 which allow the headrest to be adjusted up and down to satisfy the individual occupant. The clamping screw 13 engages the adjustment holes 12 in a manner which will be described later in some detail.

The support rods 11 are attached to the seat by the clamp assemblies which are generally designated 14. The main elements of the clamp assembly 14 are a rigid bottom plate member 15 which rests up against the back of the seat as most clearly seen in FIG. 4; a separate, rigid top plate member 16 which fits over the bottom plate member 15; and a clamping screw 13. The top plate member 16 is shaped to provide a slot opening 17 between it and the bottom plate member 15 through which the support strap 11 passes. The bottom and top plate clamp members 15 and 16 are held together and firmly attached to the seat by a pair of self tapping screws 18 located near the right and left ends of the clamp assembly. The screw 18 passes through suitable holes in the clamp plate members 15 and 16 and threads itself into a main support bar 20 of the seat in a manner as most readily seen in FIG. 3. With the clamp assemblies 14 rigidly attached to the seat in the described manner, the ends of the headrest support straps 11 are inserted into the openings 17 and the headrest is positioned vertically to the comfort of the occupant of the seat. The adjusting holes 12 are of somewhat reduced diameter from that of the threaded shank 21 of the clamping screw 13 so that as the latter is threaded through the top plate member 16 its tapered end 22 will seat in one of the adjustment holes 12. The clamp screw 13 is threaded in until it pushes the headrest support strap 11 tightly against the inner face of the bottom plate member 15 and thereby firmly secures it in position. Because at least the end of the screw is partly inserted in the smaller adjustment hole 12 in the support strap, it provides additional support in shear to prevent the support strap 11 and the headrest 10 from slipping downward in the event of a sudden impact.

Referring particularly to FIG. 3, it can be seen that the underside of the bottom clamp member 15 which rests up against the back of the seat, has a shallow U-shaped groove 23 down the center and flares outward to a flat surface 24 along the top and bottom edges. With this construction the clamp assembly is adaptable for use with the various types of seats commonly found in the various makes of automobiles. As illustrated in FIG. 3, in a seat which has a main support rod 20 across its back made out of rigid pipe or curved channel, the bottom plate member 15 will nest on the rod 20 in conformance with its contour. In the event the seat support rod 20 is the flat variety there would be a gap between the underside of the bottom plate member 15 and the seat support rod 20 along the center groove 23 but the flat portion 24 at the top and bottom edges would rest securely against the flat seat support rod to anchor the clamps.

The bottom plate member 15 further provides protection for the upholstery at the back of the seat so that it won't be damaged when the headrest support straps 11 are secured within the clamp assemblies. Without this protection the straps 11 likely would cause unsightly tears in the upholstery. As an aded safety feature the head of the clamping screw 13 is coated with a plastic material 25 and its edges smoothened to minimize the danger to the occupant of the back seat in the event a sudden impact would throw the occupant forward toward the front seat.

I claim:

1. Apparatus for removably attaching to a seat a headrest having downward extending support rods, said apparatus comprising: a rigid bottom plate clamp member, a separate rigid top plate clamp member and screw means for joining said members together; the underside of said bottom plate member having a lengthwise shallow U-shaped groove for nesting against a support bar near the outer back of the seat; said screw means passing through both plate clamp members for threadably attaching said clamp members to said seat support bar; said clamp members constructed such that when joined together and attached to said seat support bar they form an opening between them for receiving a headrest support rod; and further screw means threaded through said top plate clamp member into said opening for engaging the headrest support rod and releasably securing it firmly between said clamp members.

2. The invention as described in claim 1 wherein said further screw means engages the headrest support rod by pressing part way into the headrest support rod while forcing the headrest support rod firmly against the bottom plate clamp member.

3. The invention as described in claim 2 wherein said first mentioned screw means comprises a pair of screws each located near an end of said clamp members; and said opening for receiving the headrest support rod is located between said attaching screws.

4. The invention as in claim 1 further characterized by said bottom plate clamp member having flat flanges flaring outward from the edges of said grooves for resting against a seat support bar.

5. The invention as in claim 4 further characterized by said top plate clamp member having a shallow U-shaped groove on its underside for nesting against the bottom plate member.

References Cited

UNITED STATES PATENTS

| | | | |
|---|---|---|---|
| 1,867,600 | 7/1932 | Schwarzkopf | 297—410 |
| 2,761,643 | 9/1956 | Ward | 248—221 X |
| 3,205,005 | 9/1965 | Brown | 297—397 |
| 3,253,859 | 5/1966 | Merriman | 297—397 |
| 3,138,260 | 6/1964 | Tedrick | 248—221 X |

CHANCELLOR E. HARRIS, *Primary Examiner.*